United States Patent [19]

Scrivo

[11] 4,348,042
[45] Sep. 7, 1982

[54] VEHICLE BUMPER ASSEMBLY

[75] Inventor: Jerry V. Scrivo, Dover, N.H.

[73] Assignee: Ex-Cell-O Corporation, Troy, Mich.

[21] Appl. No.: 168,477

[22] Filed: Jul. 14, 1980

[51] Int. Cl.³ .............................................. B60R 19/00
[52] U.S. Cl. .................................... 293/120; 293/122
[58] Field of Search ........................ 293/120, 121, 122

[56] References Cited

U.S. PATENT DOCUMENTS

| 3,572,465 | 3/1971 | Olson | 188/1 |
| 3,869,165 | 3/1975 | Miller | 293/121 |
| 3,877,741 | 4/1975 | Wilfert | 293/120 |
| 4,106,804 | 8/1978 | Scrivo | 293/121 |

Primary Examiner—Robert R. Song
Assistant Examiner—John A. Carroll
Attorney, Agent, or Firm—McGlynn and Milton

[57] ABSTRACT

A vehicle bumper assembly including an elongated mounting beam adapted for being an integral part of the vehicle structure and an energy absorber for absorbing impact energy. The energy absorber is connected to the mounting beam and is supported thereby. The assembly is characterized by the mounting beam including two vertically spaced and interconnected hollow tubular portions. Each of the tubular portions has a closed crossed section and extends along the length of the mounting beam for providing structural rigidity and minimal deflection of the beam under impact loads. The mounting beam and tubular portions may be made from a single piece of sheet metal or the tubular portions can be stamped from separate pieces of sheet metal welded together to form the mounting beam.

24 Claims, 4 Drawing Figures

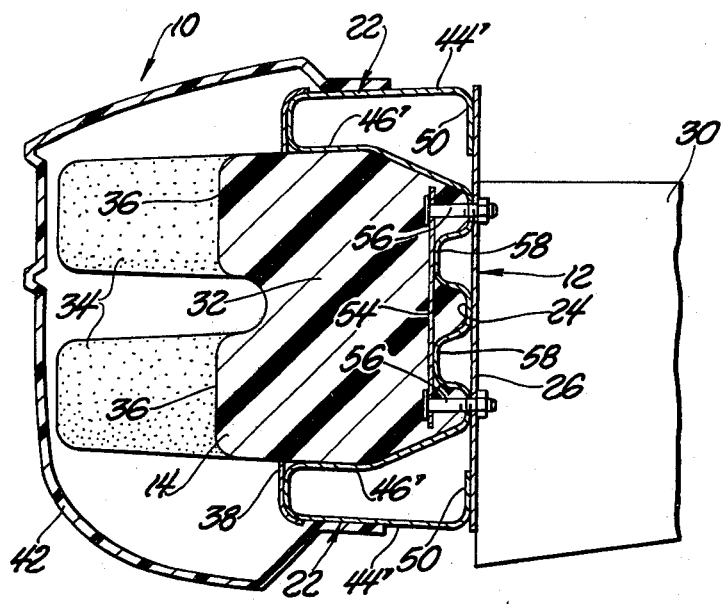
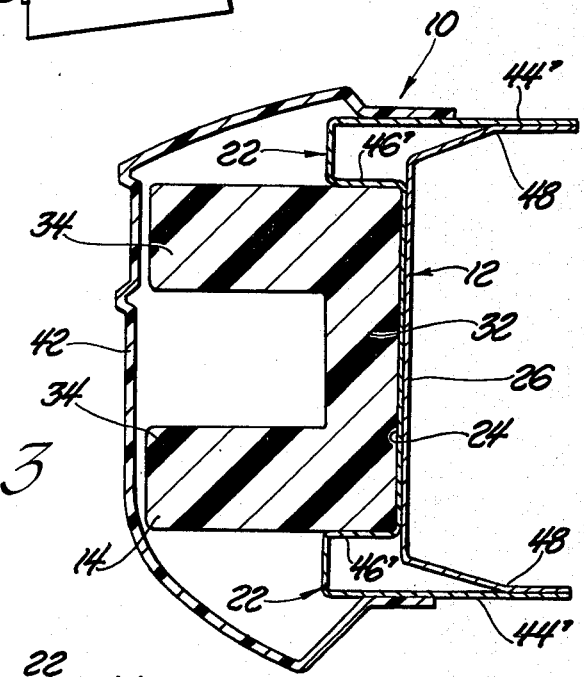
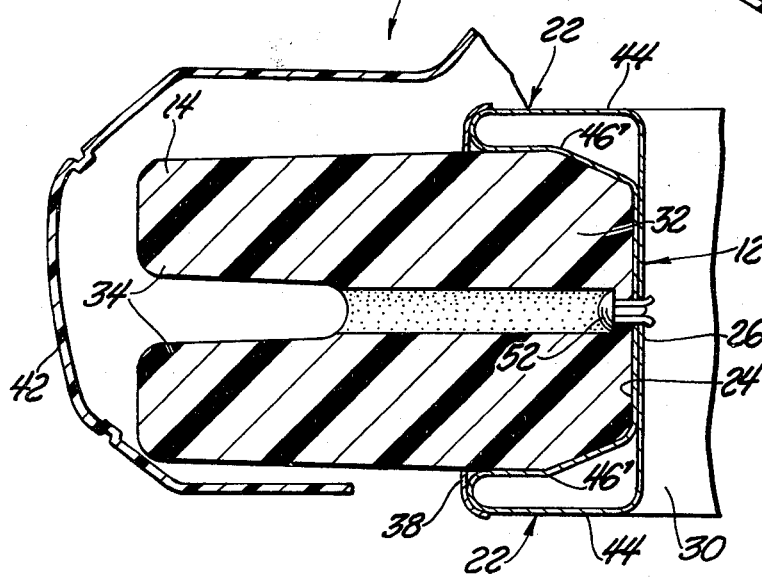

VEHICLE BUMPER ASSEMBLY

BACKGROUND OF THE INVENTION (1) Field of the Invention

The instant invention relates to a bumper assembly for an automobile.

(2) Description of the Prior Art

In the automotive industry it is desirable to manufacture lightweight parts at a minimum cost. To accomplish this end with regard to the bumper art, manufacturers have designed various bumpers that are simple in design and include various structural reinforcements for providing additional deformation resistance.

A problem exists wherein prior bumpers require a standard reinforcement for supporting an elastomeric energy absorber. In other words, the prior art bumper assemblies are attached to a structure forming a part of the vehicle frame. This structure adds undesirable weight to the automobile. Also, prior art bumper structures include structural reinforcements which could not be adapted to be an integral part of the vehicle structure for supporting such structures as a hood latch or radiator mount, since those structural reinforcements of the prior art are not sufficiently rigid.

The instant invention solves the above problems by providing a lightweight mounting member adapted for being an integral part of the vehicle frame structure. The mounting member is constructed so as to provide maximum structural rigidity and deformation resistance.

SUMMARY OF THE INVENTION

The instant invention provides a vehicle bumper assembly comprising an elongated mounting beam adapted for being an integral part of the vehicle structure and an energy absorber for absorbing impact energy. The energy absorber is connected to the mounting beam for support thereby. The assembly is characterized by the mounting beam including two vertically spaced and interconnected hollow, tubular portions. Each of the tubular portions has a closed cross section and extends along the length of the mounting beam for providing structural rigidity and minimal deflection under impact loads.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a cross-sectional view of a first embodiment of the instant invention;

FIG. 3 is a cross-sectional view of a second embodiment; and

FIG. 4 is a cross-sectional view of a third embodiment.

DESCRIPTION OF PREFERRED EMBODIMENT

Figure 1:
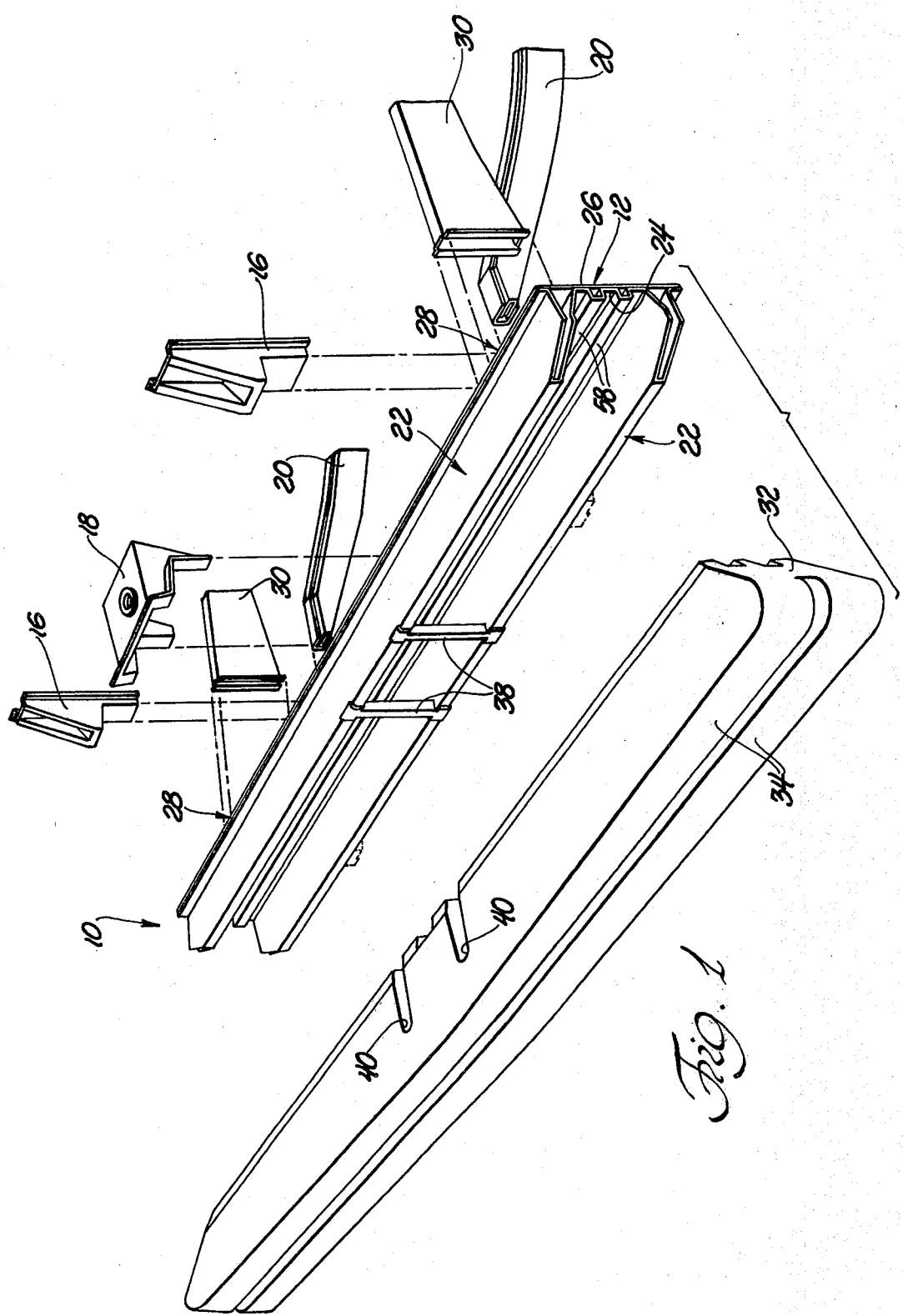
FIG. 1 is an exploded perspective view of the instant invention.

A vehicle bumper assembly constructed in accordance with the instant invention is generally shown at 10.

The assembly 10 includes an elongated mounting means generally indicated at 12 adapted for being an integral part of the vehicle frame structure. In other words, as shown in FIG. 1, the mounting means 12 functions as a cross beam for supporting an energy absorber 14 and also functions as a support for such vehicle structures as the radiator mounts 16, and the hood latch 18. The mounting means 12 can also include attachment means for attachment to the engine cradles 20. Therefore, the mounting means is an integral part of the vehicle frame structure for supporting other vehicle parts.

The assembly also includes an energy absorber 14 for absorbing impact energy. The energy absorber 14 is connected to the mounting means 12 for support thereby.

The instant invention is characterized by the mounting means 12 including two vertically spaced and interconnected hollow, tubular portions generally indicated at 22. Each of the tubular portions 22 have a closed cross section and extend along the length of the mounting means 12 for providing structural rigidity and minimal deflection under impact loads. This "dual box" structure has been found to be highly resistant to twisting in that under test conditions the "dual box" structure of the instant invention was found to reduce twist to twenty-five percent of that associated with prior art bumper structures. Therefore, the dual box construction provides maximum structural rigidity below the energy absorber 14 relative to the loading forces yet is relatively lightweight. This property of torque resistance allows the mounting means 12 to function as an integral part of the vehicle structure further reducing frame components and weight.

The mounting means includes a back portion consisting of two layers 24 and 26 of engaging sheet metal. The back portion extends between and interconnects the tubular portions 22. The energy absorber 14 engages the back portion and extends vertically between and engages the tubular portions 22. The energy absorber 14 extends away from the back portion forwardly beyond the tubular portions 22. Therefore, the energy absorber 14 receives most minor impact forces sparing the tubular portions 22 from impact and the resulting compression.

As previously stated, the mounting means 12 comprises formed sheet metal components defining the tubular portions 22 with two layers 24 and 26 of engaging sheet metal defining the back portion. The tubular portions 22 extend forwardly from the back portion.

As shown in FIG. 1, the mounting means 12 includes attachment means generally indicated at 28 secured to the back portion thereof and adapted for attachment to the vehicle frame structure 30. The attachment means 28 may consist of holes in the mounting means 12 to which the frame members 30 are secured. The mounting means 12 has the required structural rigidity to compensate for the holes in the beam structure due to the reinforcing structure of the "dual box" construction. Additional holes may be made in the back portion of the mounting means 12 to reduce weight or as to function as attachment sites for the hood latch 18 or the radiator mounts 16. Therefore, unlike prior art cross beam constructions, the instant invention provides a mounting means 12 which is secured directly to the longitudinal vehicle frame members 30. Also, the structural design provides sufficient structural support and additional weight reduction.

The energy absorber 14 has a cross-sectional U shape defining a base portion 32 and two legs 34 extending therefrom. The base portion 32 of the energy absorber 14 is disposed adjacent to the first layer 24 of the base portion of the mounting means 12. As shown in FIG. 2, the legs 34 may include reduced portions 36. The reduced portions 36 also extend forwardly beyond the tubular portions 22.

The bumper assembly 10 includes securing means for securing the energy absorber 14 to the mounting means 12. The securing means includes a plurality of strap members 38, as shown in FIGS. 1, 2 and 4. The strap members extend between the tubular portions 22 and are secured thereto. The strap members 38 secure the energy absorber 14 to the mounting means 12 and also provide resistance to compression forces which tend to separate the tubular portions 22.

The energy absorber 14 includes at least one recessed portion 40, as shown in FIG. 1, extending at a distance equal to the forward extremity of the tubular portions 22 such that the strap members 38 extend through the recessed portions 40. As shown in FIG. 1, the recessed portions extend inwardly from the back portion of the energy absorber 14. The energy absorber may be constructed alternatively such that the recessed portions extend inwardly from the outer portion of the energy absorber 14. These voids which define the recessed portions 40 may prevent bending of the strap members 38 upon impact compressing the energy absorber 14.

As shown in FIGS. 2, 3 and 4, the assembly 10 includes an elongated shell 42 disposed adjacent the mounting means 12 and about the energy absorber 14. The shell 42 is made from a resilient polymeric material and forms a part of the exterior of the vehicle. The energy absorber 14 comprises an elastomeric material which is adapted to absorb impact forces.

In a first embodiment of the instant invention shown in FIG. 4, each of the tubular portions 22 includes a first leg 44 integral with the second layer 26 of sheet metal of the back portion and a second leg 46 integral with the first layer 24 of sheet metal of the back portion. In other words, the mounting means 12 consists of a single piece of sheet metal comprising the back portion and two tubular members 22.

Two alternative embodiments of the instant invention are shown in FIGS. 2 and 3 wherein each of the tubular portions 22 includes a first leg 44' fixedly secured to the second layer 26 of sheet metal of the back portion and a second leg 46' integral with the first layer 24 of sheet metal of the back portion. As shown in FIG. 3, the second layer 26 of sheet metal of the back portion includes a flange 48 extending from each end thereof. The first leg 44' of each of the tubular portions 22 is fixedly secured to corresponding flanges 48. In the embodiment shown in FIG. 2, each of the first legs 44' of the tubular portions 22 includes a flange 50 extending therefrom. The flanges 50 are fixedly secured to the second layer 26 of sheet metal of the back portion. These embodiments are made from stamped sheet metal parts which are welded or otherwise connected together.

As shown in FIG. 4, the securing means may include a tack 52 disposed within the base portion 32 of the energy absorber 14 and extending rearwardly therefrom. The back portion of the mounting means 12 includes holes therethrough, as previously described. The tack 52 extends through the hole and is secured to the other side thereof for providing additional securement of the energy absorber 14 to the mounting means 12.

An alternative construction is shown in FIG. 2 wherein the securing means includes a plate member 54 disposed in the base portion 32 of the energy absorber 14. The plate member 54 has fastening means 56 extending through the energy absorber 14 for further securing the energy absorber 14 to the mounting means 12. The fastening means may consist of a bolt extending from the plate 54, the bolt being secured to the mounting means 12 by an appropriate nut.

As shown in FIGS. 1 and 2, the mounting means 12 may include integral ridges 58 extending longitudinally for providing additional structural reinforcement.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A vehicle bumper assembly (10) comprising; elongated mounting means (12) adapted for being an integral part of the vehicle structure, energy absorber means (14) for absorbing impact energy, said energy absorber means (14) being connected to said mounting means (12) for support thereby, and characterized by said mounting means (12) including two vertically spaced and interconnected hollow tubular portions (22), each of said tubular portions (22) having a closed cross section and extending along the length of said mounting means (12) for providing structural rigidity and minimal deflection under impact loads, said mounting means (12) including a back portion (24, 26) extending between and interconnecting said tubular portions (22), said energy absorber means (14) engaging said back portion (24, 26) and extending vertically between and engaging said tubular portions (22), said energy absorber means (14) extending away from said back portion (28, 26) forwardly beyond said tubular portions (22).

2. An assembly as set forth in claim 1 wherein said mounting means (12) comprises formed sheet metal components defining said tubular portions (22) with two layers (24 and 26) of engaging sheet metal defining said back portion, said tubular portions (22) extending forwardly from said back portion.

3. An assembly as set forth in claim 1 wherein said mounting means (12) includes attachment means (28) secured to said back portion (24, 26) and adapted for attachment to a vehicle frame structure (30).

4. An assembly set forth in claim 1 including hood latch means (18) secured to said back portion (24, 26) for cooperation with a vehicle hood.

5. An assembly as set forth in claim 1 wherein said energy absorber means (14) has a cross-sectional U shape defining a base portion (32) and two legs (34) extending therefrom, said base portion (32) of said energy absorber means (14) disposed adjacent to said base portion (24) of said mounting means (12).

6. An assembly as set forth in claim 5 including securing means for securing said energy absorber (14) to said mounting means (12).

7. An assembly as set forth in claim 6 wherein said securing means includes a plurality of strap members

(38) extending between said tubular portions (22) and being secured thereto.

8. An assembly as set forth in claim 7 wherein said energy absorber means (14) includes at least one recessed portion extending thereinto at a distance equal to the forward extremity of said tubular portions (22), said strap members extending through said recessed portions (40).

9. An assembly as set forth in claim 8 including an elongated shell (42) disposed adjacent said mounting means (12) and about said energy absorber means (14).

10. An assembly as set forth in claim 9 wherein said energy absorber means (14) comprises an elastomeric material.

11. An assembly as set forth in claim 10 wherein said mounting means (12) comprises formed sheet metal components defining said tubular portions (22) with two layers (24, 26) of engaging sheet metal defining said back portion, said tubular portions (22) extending forwardly from said back portion.

12. An assembly as set forth in claim 11 wherein each of said tubular portions (22) includes a first leg (44) integral with a first of said layers (26) of sheet metal of said back portion and a second leg (46) integral with a second of said layers (24) of sheet metal of said back portion.

13. An assembly as set forth in claim 12 wherein each of said tubular portions (22) includes a first leg (44') fixedly secured to a first of said layers (26) of sheet metal of said back portion and a second leg (46') integral with a second of said layers (24) of sheet metal of said back portion.

14. An assembly as set forth in claim 13 wherein said first layer (26) of sheet metal of said back portion includes a flange (48) extending from each end thereof, said first leg (44') of each of said tubular portions (22) being fixedly secured to a corresponding one of said flanges (48).

15. An assembly as set forth in claim 13, wherein each of said first legs (44') of said tubular portions (22) includes a flange (50) extending therefrom, said flanges (50) being fixedly secured to said first layer (26) of sheet metal of said back portion.

16. An assembly as set forth in claim 10 wherein said securing means includes a tack (52) disposed within said base portion (32) of said energy absorber means (14) and extending therefrom, said back portion of said mounting means (12) having holes therethrough, said tack (52) extending through said hole for providing additional securement of said energy absorber means (14) to said mounting means (12).

17. An assembly as set forth in claim 10 wherein said securing means includes a plate member (54) disposed in said base portion (32) of said energy absorber means (14), said plate member (54) having fastening means extending through said energy absorber means (14) for further securing said energy absorber means (14) to said mounting means (12).

18. An assembly as set forth in claim 11 wherein one of said layers (24, 26) of sheet metal of said back portion includes integral ridges (58) extending longitudinally for providing structural reinforcement.

19. A vehicle assembly comprising; a vehicle support frame assembly including two spaced longitudinal frame members (30), elongated mounting means (12) directly connected to said frame members (30) for being an integral part of said vehicle support frame assembly, energy absorber means (14) for absorbing impact energy, said energy absorbing means (14) being connected to said mounting means (12) for support thereby, and characterized by said mounting means (12) including two vertically spaced and interconnected hollow tubular portions (22), each of said tubular portions (22) having a closed cross section and extending along the length of said mounting means (12) for providing structural rigidity and minimal deflection under impact loads whereby said mounting means forms part of the vehicle support frame structure while directly supporting the energy absorber means (14), said mounting means (12) including a back portion (24, 26) extending between and interconnecting said tubular portions (22), said energy absorber means (14) engaging said back portion (24, 26) and extending vertically between and engaging said tubular portions (22), said energy absorber means (14) extending away from said back portion (24, 26) forwardly beyond said tubular portions (22), said back portion (24, 26) being directly connected to said frame members (30).

20. An assembly as set forth in claim 1 including hood latch means (18) secured to said back portion (24, 26) for latching cooperation with a vehicle hood.

21. An assembly as set forth in claim 20 wherein said mounting means (12) includes attachment means (28) secured to said back portion (24, 26) for attachment to said vehicle support frame assembly.

22. An assembly as set forth in claim 21 wherein said energy absorber means (14) has a cross-sectional U shape defining a base portion (32) and two legs (34) extending therefrom, said base portion (32) of said energy absorber means (14) disposed adjacent to said base portion (24) of said mounting means (12).

23. An assembly as set forth in claim 22 including securing means for securing said energy absorber (14) to said mounting means (12).

24. An assembly as set forth in claim 23 wherein said securing means includes a plurality of strap members (38) extending between said tubular portions (22) and being secured thereto.

* * * * *